United States Patent [19]
Wang

[11] Patent Number: 6,099,082
[45] Date of Patent: Aug. 8, 2000

[54] AUTOMOBILE WHEEL COVER

[76] Inventor: Chu-Li Wang, No. 295, Lane 168, Sec. 1, Chang Hsi Road, Tainan, Taiwan

[21] Appl. No.: 09/152,125

[22] Filed: Sep. 14, 1998

[51] Int. Cl.⁷ ........................................................ B60B 7/12
[52] U.S. Cl. ...................................... 301/37.33; 301/37.32
[58] Field of Search ................................. 301/37.1, 37.31, 301/37.32, 37.33, 37.42

[56] References Cited

U.S. PATENT DOCUMENTS

| | | | |
|---|---|---|---|
| 5,064,249 | 11/1991 | Hung | 301/37.42 |
| 5,161,860 | 11/1992 | Sakane | 301/37.42 |
| 5,700,062 | 12/1997 | Wang | 301/37.33 |
| 5,895,166 | 4/1999 | Tsai | 301/37.32 X |

*Primary Examiner*—Russell D. Stormer
*Attorney, Agent, or Firm*—Bacon & Thomas, PLLC

[57] ABSTRACT

The degree of tightness in which a wheel cover is attached to the wheel of an automobile may be varied by selectively engaging a steel ring of the cover in vertically spaced horizontal grooves formed in a plurality of circumferentially spaced ring supporters.

2 Claims, 5 Drawing Sheets

AUTOMOBILE WHEEL COVER

BACKGROUND OF THE INVENTION

This invention relates to an automobile wheel cover, and particularly to one that is easy to safety adjust the tightness of the wheel cover body and quickly fixing the wheel cover on a wheel.

A conventional automobile wheel cover is shown in FIG. 1, and includes a wheel cover body 1, a steel ring 2 with two ends, and a plurality of ring supporters 10 fixed with the steel cover for positioning the steel ring 2. All ring supporters 10, except one, have a horizontal groove 11 for the steel ring 2 to fit therein so as to keep the steel ring 2 from loosening off. One of the ring supporters 10 is especially formed with two horizontal grooves 12, 13 respectively at an upper portion and a lower portion of one side, and a position groove 14 formed in an intermediate portion of the other side, as shown in FIG. 2. The upper horizontal groove 12 is deeper than the lower groove 13.

One end of the steel ring 2 is fitted in the position groove 14 and the other end is fitted in the lower groove 13 so that the diameter of the steel ring 2 becomes slightly smaller and the outward expansion force of the steel ring 2 is comparatively small. Provision of the two grooves 12, 13 of the ring supporters 10 results in adjusting the expanding force of the steel ring and the ring supporters 10 fixed with the wheel cover body 1.

If the wheel cover 1 is to be adjusted tighter, then the end of the wheel ring 2 fitted in the position groove 14 is maintained in position, and the other end of the steel ring 2 is pulled out of the lower deep groove 13 and fitted in the upper deeper groove 12. Then the diameter of the steel ring 2 becomes larger than that of the steel ring 2 fitted in the lower shallower groove 13 so that the outward expansion force of the steel ring 2 may become larger. Thus, the expanding force of the ring supporters 10 of the wheel cover body 1 may be adjusted.

As described above, the function of adjusting the tightness of the wheel cover body 1 is effected by fitting one end of the steel ring 2 in the position groove 14, and the other end of the steel ring 2 in the upper deeper groove 12 or the lower shallower groove 13. But in adjusting the tightness of the wheel cover body 1, the steel ring 2 must be pried off the grooves 11 of all ring supporters 10 except that having the position grooves 14 and the upper and the lower grooves 12, 13 before the two ends of the steel ring 2 may be pried off with a sufficient work space and fitted again in either of the two grooves 12, 13. If one end of the steel ring 2 is to be moved from the upper groove 12 to the lower groove 13 or vice versa, the step just described is needed. Then the remaining portion of the steel ring is fitted again in the grooves 11 of all the ring supporters 10 except that containing the two ends of the steel ring 2.

It is evident that the steel ring 2 has two ends that are not welded together, so in prying these two ends in or out of the grooves 12, 13 and 14 involves a potential danger of injury to a worker and nearby persons since the ends of the steel ring 2 have a high hardness and sharp cut edges. Thus, it is very inconvenient and dangerous to adjust the tightness of a conventional wheel cover 1. In addition, the two ends of a steel ring 2 are located at different heights after being fitted in the position groove 14 and either of the upper and the lower grooves 12, 13. Consequently, the outward expansion force received by the ring supporters 10 is not balanced.

SUMMARY OF THE INVENTION

This invention provides an automobile wheel cover having an easily and safely adjustable structure.

The main feature of the invention is a plurality of ring supporters fixed at an outer spherical edge of a wheel cover body, each ring supporter having two or more vertically spaced grooves, an upper deeper groove and a lower shallower groove for a steel ring to be selectively fitted therein to permit adjustment of the tightness of the wheel cover.

BRIEF DESCRIPTION OF DRAWINGS

This invention will be better understood by reference to the accompanying drawings. wherein.

DETAILED DESCRIPTION OF THE PREFERRED EMBODIMENT

Figure 1:
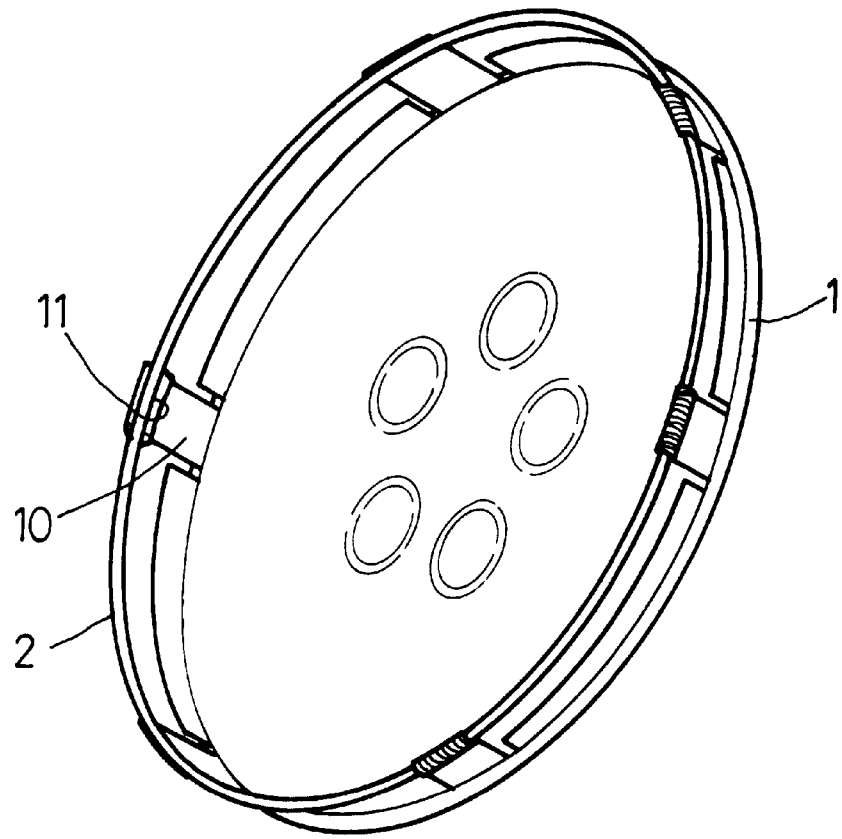
FIG. 1 is a perspective view of a conventional automobile wheel cover.
Figure 2:
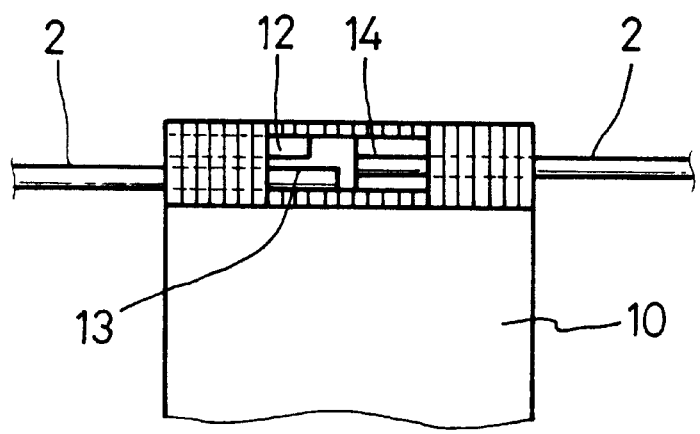
FIG. 2 is a cross-sectional view of a ring supporter of the conventional automobile wheel cover.
Figure 3:
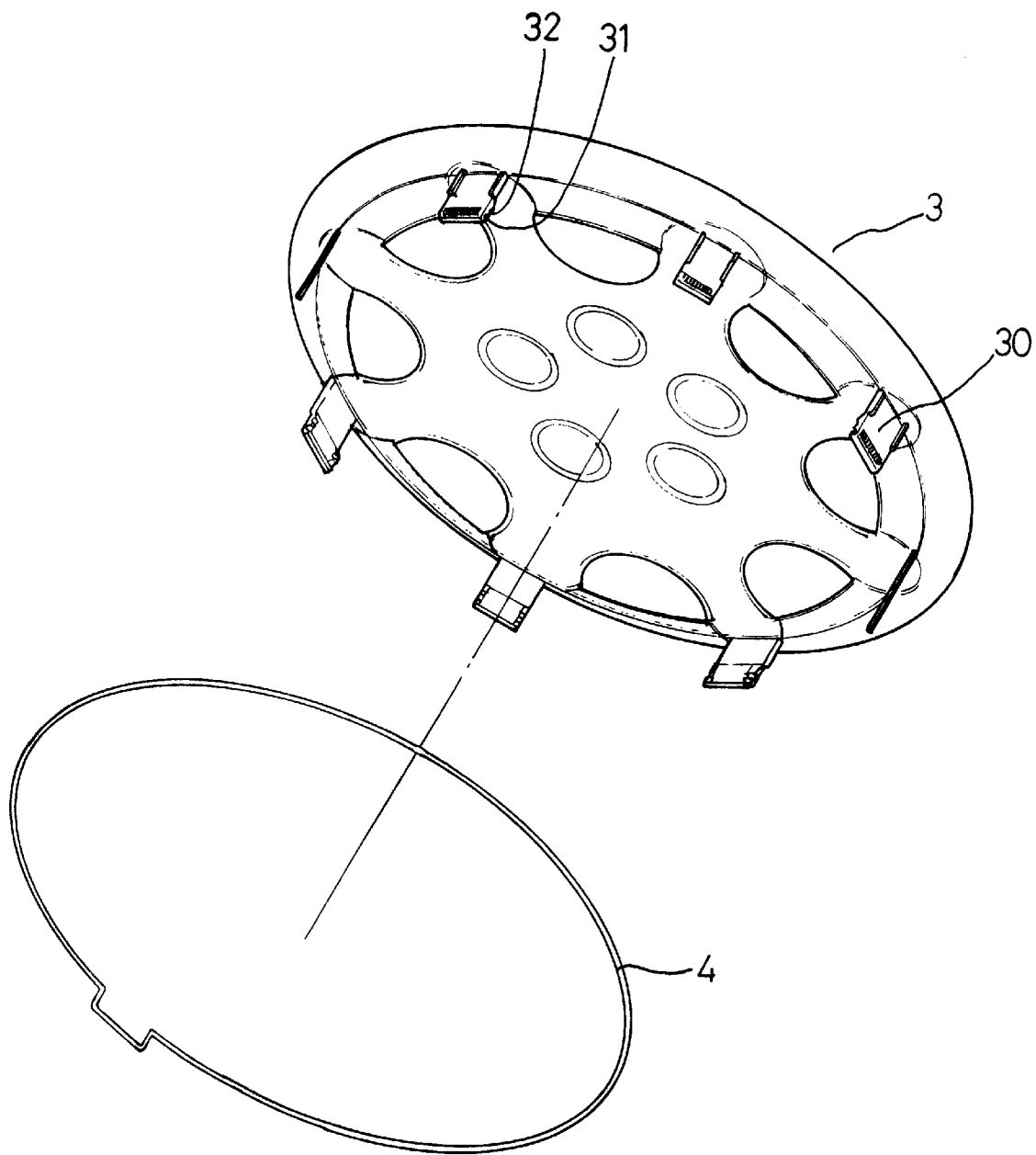
FIG. 3 is an exploded perspective view of an automobile wheel cover in the present invention.
Figure 4:
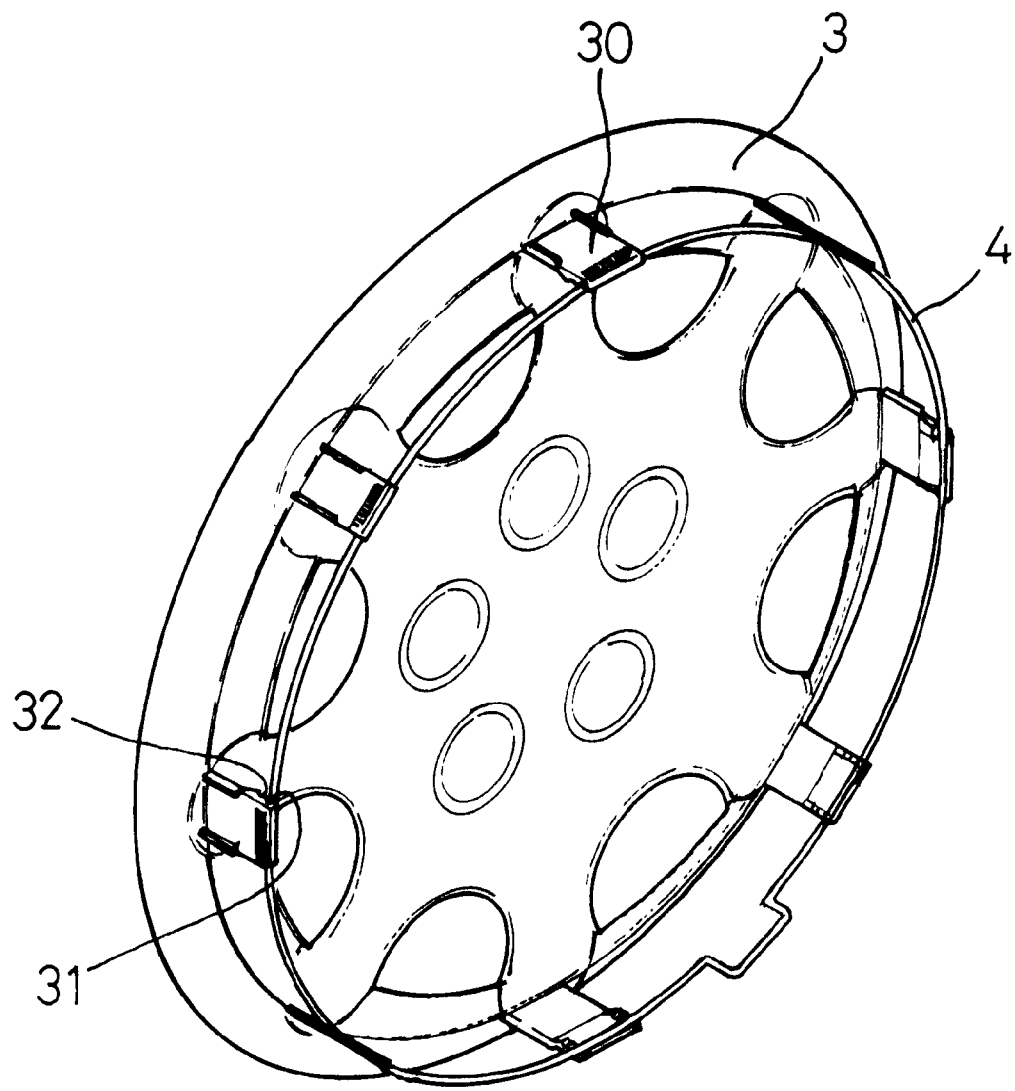
FIG. 4 is a perspective view of the automobile wheel cover in the present invention.

A preferred embodiment of an automobile wheel cover in the present invention, as shown in FIGS. 3 and 4, includes a wheel cover body 3, a plurality of ring supporters 30 fixed on and spaced around an outer spherical edge of the wheel cover body 3, and a steel ring 4 fitted on the ring supporters 30, in the same manner as the conventional wheel cover described above.

The structure of the ring supporters 30 and the steel ring 4 in the present invention are different from those in the conventional wheel cover. The steel ring 4 is a continuous ring without ends so that arranging or relocating the ring will not pose any danger of hurting a worker or nearby persons. Each ring supporter 30 has two vertically spaced horizontal grooves, including an upper deeper groove 31 and a lower shallower groove 32, as shown in FIGS. 5–8. However, the number of horizontal grooves need not be limited to two, since it is possible to utilize more than two grooves.

Figure 7:
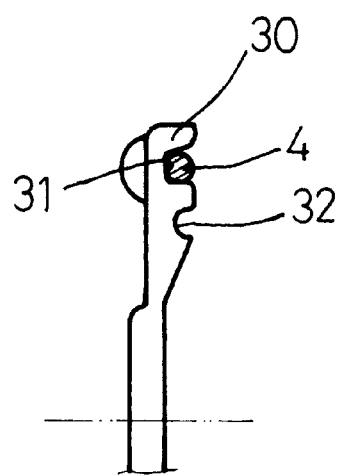
FIG. 7 is a cross-sectional view of the engaged steel ring adjusted in a loose condition in the automobile wheel cover in the present invention.

In fact, wheel rims and wheel covers commonly have some gap between them before they are combined together, so a wheel cover body has to be provided with ring supporters with a steel ring for expanding out the ring supporters 30 so that a wheel cover body 3 may be positioned tightly on a wheel rim. Thus, a wheel cover body 3 should have a tightness adjusting structure formed by ring supporters 30 and a ring 4. Therefore, if the wheel ring 3 is desired to be adjusted loosely in the present invention, the steel ring 4 is engaged in the upper deeper grooves 31 of the ring supporters 30, as shown in FIG. 7 and as shown in solid line in FIG. 5.

Figure 5:
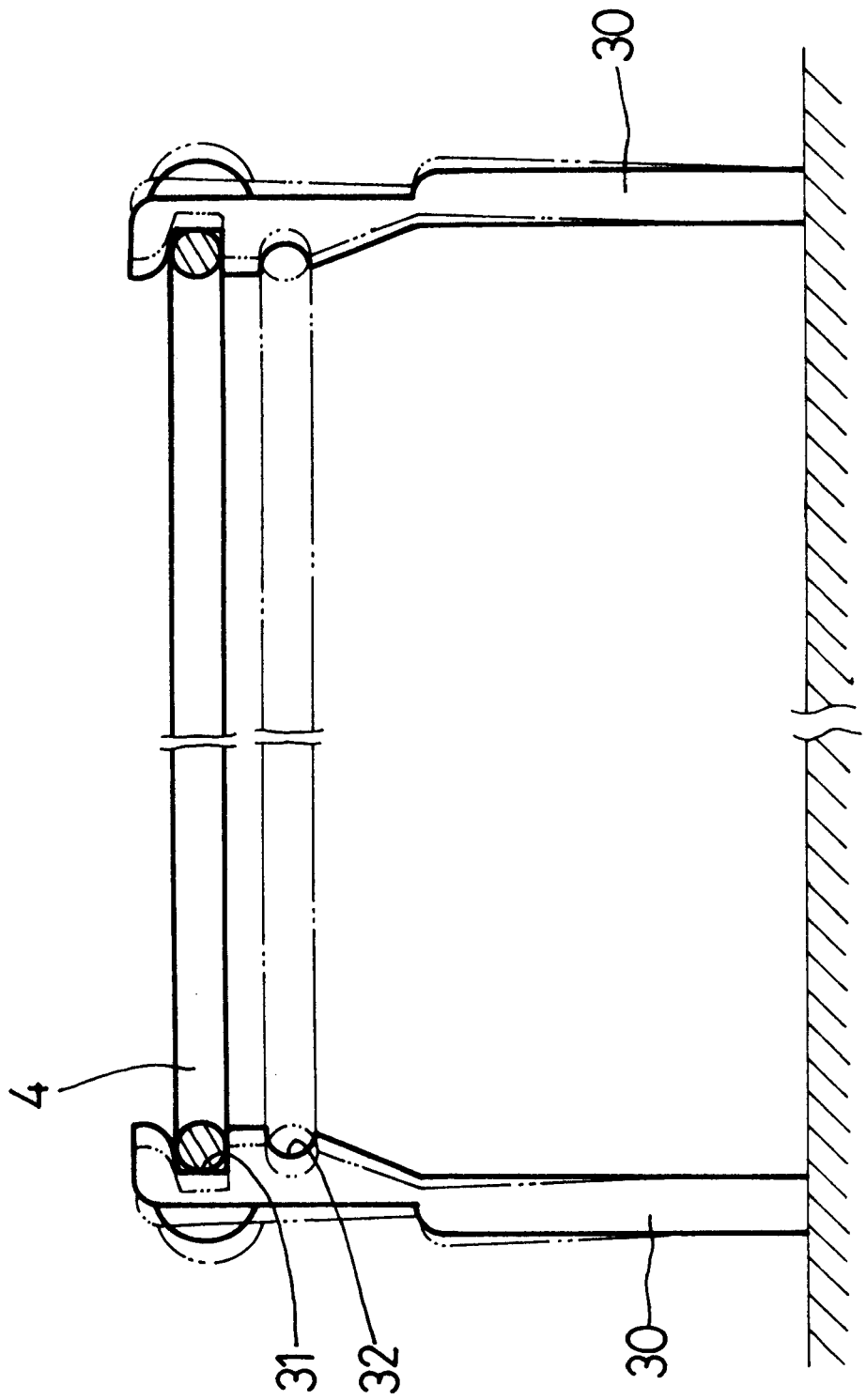
FIG. 5 is a cross-sectional view of the automobile wheel cover in the present invention.
Figure 6:
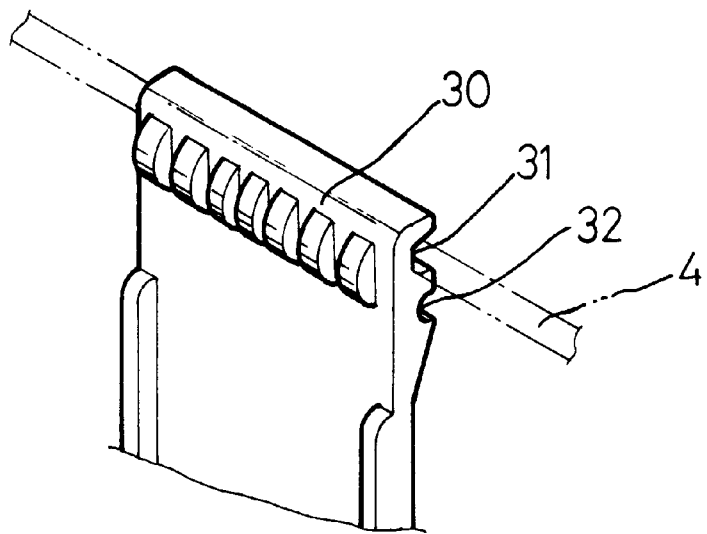
FIG. 6 is an enlarged perspective view of a ring supporter with a part of a steel ring to be engaged with the ring supporters in the automobile wheel cover in the present invention.
Figure 8:
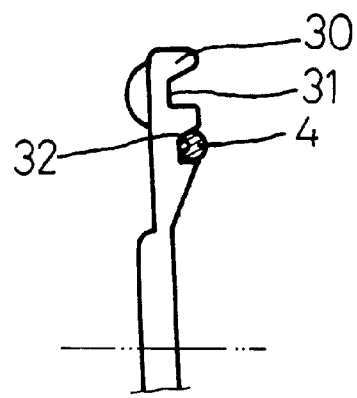
FIG. 8 is a cross-sectional view of the engaged steel ring adjusted in a tight condition in the wheel cover in the present invention.

On the contrary, if the wheel ring 3 is desired to be adjusted tightly, the steel ring 4 is pried off or disengaged from the upper deeper grooves 31 of all the ring supporters 30, and then fitted in or engaged in the lower shallower grooves 32 of all the ring supporters 30 as shown in FIG. 8, and as also shown in dotted line in FIG. 5. As the lower grooves 32 are shallower than the upper grooves 31, the ring supporters 30 may be expanded outwardly by the steel ring 4, thus obtaining a tight adjustment. Even if the upper and the lower grooves 31 and 32 should be of the same depth, there will be different outwardly expanding forces between them. In other words, when the ring 4 is engaged in the upper grooves 31, the ring supporters 30 are expanded out slightly, but when the ring 4 is engaged in the lower grooves 32, the ring supporters 30 are expanded out slightly more since the ring 4 in the grooves 32 is positioned higher in the ring supporters 30 than when it is in grooves 31. So the two grooves 31,32 with the same depth can obtain the same function of different expansions as those with different depths.

It is very convenient to adjust the tightness of a wheel cover in the present invention by only engaging the steel ring 4 in either the upper deeper grooves 31 or in the lower shallower grooves 32. In addition, any potential danger of injuring a worker or nearby persons is completely eliminated by the present invention with the balanced expansion force provided by the ring 4.

While the preferred embodiment of the invention has been described above, it will be recognized and understood that various modifications may be made thereto and the appended claims are intended to cover all such modifications which may fall within the spirit and scope of the invention.

What is claimed is:

1. An automobile wheel cover including a wheel cover body, a plurality of ring supporters fixed to and spaced apart around an outer peripheral edge of said wheel cover body, and a steel ring detachably engaged on said ring supporters, the improvement comprising each said ring supporter being provided with at least two spaced for selective engagement by said steel ring to adjust the tightness of said wheel cover body.

2. The automobile wheel cover as claimed in claim 1, wherein one of said two grooves is deeper than the other said groove.

\* \* \* \* \*